United States Patent [19]

Dickson

[11] Patent Number: 4,578,848

[45] Date of Patent: Apr. 1, 1986

[54] METHOD FOR THE MANUFACTURE OF FLANGED BEARINGS

[75] Inventor: Eric W. Dickson, Taunton, United Kingdom

[73] Assignee: AEPLC, England

[21] Appl. No.: 514,344

[22] Filed: Jul. 15, 1983

[30] Foreign Application Priority Data

Sep. 9, 1982 [GB] United Kingdom ................ 8225675

[51] Int. Cl.⁴ ............................................. B21D 53/10
[52] U.S. Cl. ........................ 29/149.5 DP; 29/149.5 S
[58] Field of Search ................. 29/149.5 DP, 149.5 S, 29/149.5 R

[56] References Cited

U.S. PATENT DOCUMENTS

| 4,044,441 | 8/1977 | Morrison | 29/149.5 DP |
| 4,212,095 | 7/1980 | Warchol | 29/149.5 S |
| 4,409,715 | 10/1983 | Timmer | 29/149.5 DP |
| 4,462,144 | 7/1984 | White | 29/149.5 DP |

Primary Examiner—Howard N. Goldberg
Assistant Examiner—Vernon K. Rising
Attorney, Agent, or Firm—Price, Heneveld, Huizenga & Cooper

[57] ABSTRACT

A method of forming a flanged bearing from a strip having a steel backing and a lining of bearing metal. Firstly, an aperture is formed in the backing, then a collar is punched out of the strip material surrounding the aperture. Finally, the collar is blanked out of the strip leaving a flange.

5 Claims, 3 Drawing Figures

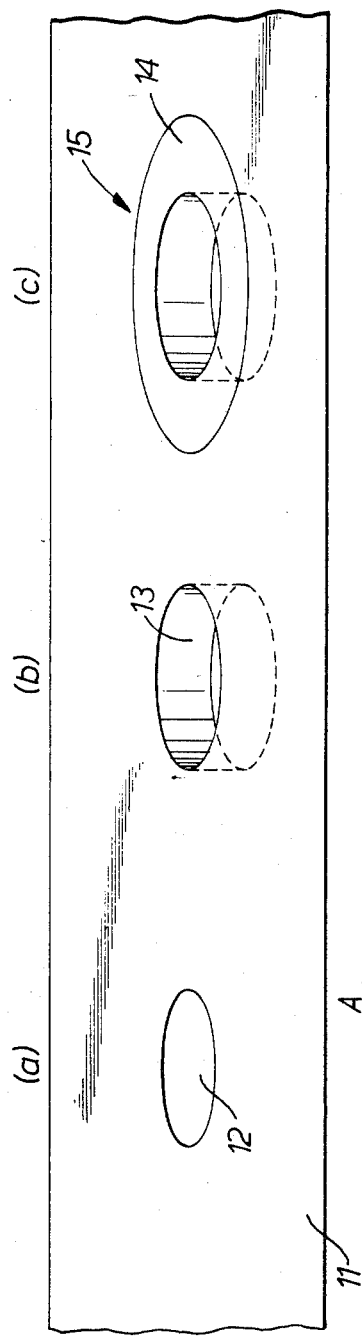
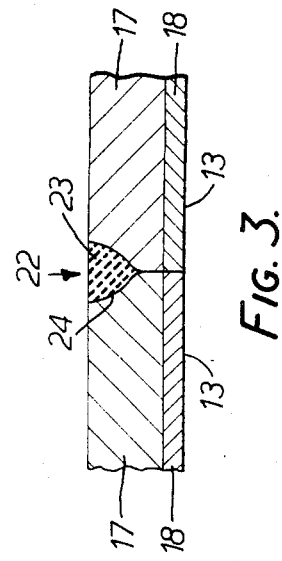
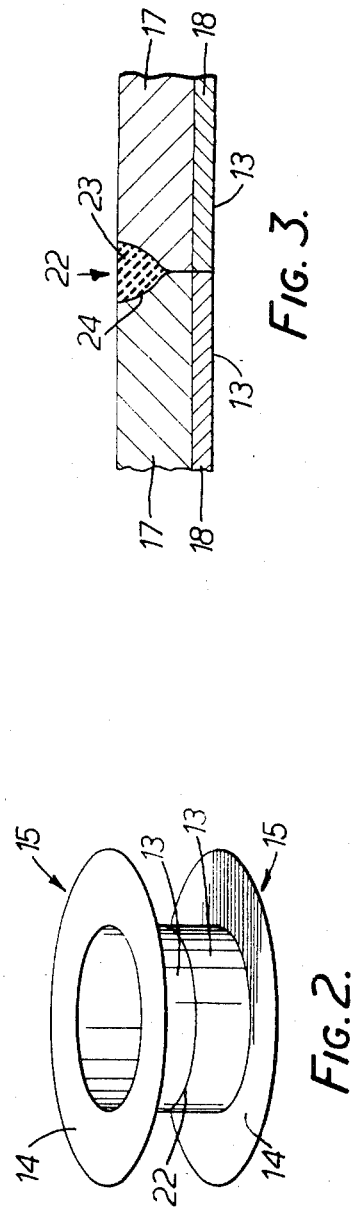

METHOD FOR THE MANUFACTURE OF FLANGED BEARINGS

BACKGROUND OF THE INVENTION

The present invention relates to a method for the manufacture of flanged bearings.

In one known method of producing flanged plain bearings a metal backing is coated with a bearing material, a strip of the desired size is cut, the edges are bent up to form the flanges and this is subjected to a bend punching operation to form a semi-cylindrical flanged plain bearing. This method suffers the disadvantages that it is quite difficult to achieve an even, truly semi-cylindrical form without any buckling and it is also difficult to ensure that the flanges extend to the required distance, particularly at their outer perimeters. There is also risk of damage to the coating with the result that frequently, considerable further finishing may be required.

SUMMARY OF THE INVENTION

It is an object of the present invention to provide a method of producing a flanged plain bearing which is simpler and more economical and which preferably does not suffer the above disadvantages.

According to the present invention there is provided a method of manufacturing a flanged bearing from a bearing strip comprising a metal backing having a coating of a bearing material and method comprising forming an aperture in the strip, raising a cylindrical collar from the material of the strip immediately surrounding the aperture and shaping the strip around the position of the aperture to define a flange surrounding the collar in the final single flanged bush.

The shaping step preferably comprises punching the flanged bush from the strip and may be carried out before forming the aperture or after forming the aperture but before raising the collar but is preferably carried out after the collar has been raised.

The collars of two of the two bushes may be butt joined to form a double flanged cylindrical bearing, e.g. by welding, preferably laser beam welding.

If a long bearing is required, a plain cylindrical section may be joined between the two collars. The speed and power of the welding are preferably controlled to ensure that the weld does not penetrate to the bearing layer.

The double flanged cylindrical bearing may be cut longitudinally into two flanged semi-cylindrical bearing shells.

BRIEF DESCRIPTION OF THE DRAWINGS

FIG. 1 shows diagrammatically the stages of forming a single flange bush;

FIG. 2 is an isometric sketch of a double flanged cylindrical bearing formed from two flanged bushes;

FIG. 3 is a detail of a welded butt joint between two bushes.

DESCRIPTION OF THE PREFERRED EMBODIMENT

The basic method is shown in FIG. 1 in which the first step, step (a), comprises punching a hole 12 in a strip 11 which is a metal backing having a bearing lining. In stage (b) a collar 13 is punched out from the material surrounding the hole with the collar 13 extending from the opposite side of the strip to that on which the bearing material is situated. Thus, the inner surface of the collar 13 has a bearing layer.

The third stage, stage (c) simply comprises punching out the final article to define a flange 14 of the required dimensions at one end of the collar 13, thus producing a single flanged bush 15.

These steps are carried out sequentially with the strip 11 moving in the direction of the arrow A in FIG. 1.

As shown in FIG. 2 two bushes 15 can be joined by a butt joint 22 between their collars 13. The butt joint 22 is shown in more detail in FIG. 3.

The joint 22 is a laser beam welded joint having a weld bear 23, which is confined to the joint between the two steel layers 17 of two adjacent collars 13.

By controlling the power and speed of the laser welding machine, the weld line 23 can be formed in the steel layer 17 without disturbing the bearing layer 18, which has a much lower melting point. It is believed that a 2 Kw laser working at 4 m/min is sufficient.

Some finishing operations may be carried out prior to the two bushes 15 being joined and/or prior to their being cut longitudinally to form two flanged semi-cylindrical bearings.

Obviously, numerous modification and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A method of manufacturing a flanged bearing from a strip of metal coated with a bearing material bonded to at least one side, including the steps:

punching an aperture through said strip; forming the material surrounding said aperture to raise from the strip a seamless cylindrical collar with said bearing material coating the inside surfaces of the collar; and at a point concentric with and space radially from said collar severing the strip to separate the bearing from the strip and to form and shape a concentric flange around one end of said collar extending radially of and perpendicular to the collar.

2. A method of manufacturing a flanged bearing including the steps of providing a strip of metal to one face of which a coating of a bearing material has previously been bonded, forming an aperture in the strip, passing a tool through the opening to form a seamless cylindrical collar from the strip extending perpendicular to the plane of the strip and immediately surrounding the aperture, after the collar has been fully formed, forming an annular flange around the collar in the plane of the strip by severing the flange from the strip.

3. The method of manufacturing a flanged bearing described in claim 2 including the further step of severing the flanged bearing from the strip by punching.

4. The method of manufacturing a flanged bearing as described in claim 3 including the further step of forming the aperture by punching.

5. The method of forming a bearing having a tubular central section and a radially extending flange at each end from a pair of bearings manufactured by the method recited in claim 2 including the steps of placing the free ends of the collars of the bearings in abutting relationship and securing the two collars together by welding applied only to the backing and only externally of the collars.

* * * * *